US008484297B2

United States Patent
Huang

(10) Patent No.: US 8,484,297 B2
(45) Date of Patent: Jul. 9, 2013

(54) METHOD FOR COLLABORATIVELY TAGGING AND HIGHLIGHTING ELECTRONIC DOCUMENTS

(75) Inventor: Qingfeng Huang, San Jose, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 515 days.

(21) Appl. No.: 12/221,107

(22) Filed: Jul. 31, 2008

(65) Prior Publication Data

US 2010/0030859 A1    Feb. 4, 2010

(51) Int. Cl.
    *G06F 15/16*    (2006.01)
(52) U.S. Cl.
    USPC ........... 709/206; 715/230; 715/231; 715/232; 715/233
(58) Field of Classification Search
    USPC .... 709/206; 715/230, 231, 232, 233; 705/319
    See application file for complete search history.

(56) References Cited

U.S. PATENT DOCUMENTS

| 2001/0042098 A1* | 11/2001 | Gupta et al. ................. 709/206 |
| 2004/0021685 A1* | 2/2004 | Denoue et al. ................ 345/721 |
| 2008/0005064 A1* | 1/2008 | Sarukkai ........................... 707/3 |
| 2008/0016164 A1* | 1/2008 | Chandra ....................... 709/206 |
| 2009/0164897 A1* | 6/2009 | Amer-Yahia et al. ......... 715/703 |
| 2009/0319288 A1* | 12/2009 | Slaney et al. ..................... 705/1 |

* cited by examiner

*Primary Examiner* — Liangche A Wang
*Assistant Examiner* — Cheikh Ndiaye
(74) *Attorney, Agent, or Firm* — Shun Yao; Park, Vaughan, Fleming & Dowler LLP

(57) ABSTRACT

One embodiment of the present invention provides a method for allowing a first user to view a collaboratively annotated electronic document. During operation, the system identifies a set of users based on the similarities of online behavior between the identified users and the first user. The system further ranks the identified users based on degrees of similarities between these users and the first user. The system then retrieves an electronic document selected for viewing by the first user and determines whether at least one of the identified users has annotated the electronic document. Based on the determination, the system augments the electronic document with annotations from the identified user and displays the annotated electronic document to the first user.

24 Claims, 4 Drawing Sheets
(1 of 4 Drawing Sheet(s) Filed in Color)

All Things Considered, November 20, 2007 · Two teams of scientists have independently discovered a way to turn ordinary human skin cells into stem cells with the same characteristics as those derived from human embryos, a breakthrough that could open the door for advanced medical therapies.

`Luk: skin cell` ← 408 410

If the work holds true to its promise, it would largely bypass ethical issues that have dogged research on human embryonic stem cells. It could also allow scientists to tailor the cells to specific individuals, eliminating the possibility of rejection. `MyHealth: ethic, stem cell` ← 406
404

The crux of the discovery, published online Tuesday by the journals *Cell* and *Science*, is a "direct reprogramming" technique that adds a cocktail of four genetic factors to run-of-the-mill human skin cells.

The *Cell* paper is from a team led by Dr. Shinya Yamanaka of Kyoto University; the *Science* paper is from a team led by Junying Yu, working in the lab of stem-cell pioneer James Thomson of the University of Wisconsin-Madison. `KoolTag:Cell, Science`
402 400

The discovery builds on work presented in 2006 by Yamanaka in which the same technique was demonstrated for skin cells from mice.

The two teams have been able to isolate cells that look and behave like embryonic stem cells. The researchers caution that there are still many steps to take before the cells are useful for human therapies.

Yamanaka said he knew that the real payoff would be if his work on mouse cells could be translated to human cells.

FIG. 4

METHOD FOR COLLABORATIVELY TAGGING AND HIGHLIGHTING ELECTRONIC DOCUMENTS

RELATED APPLICATION

The instant application is related to U.S. patent application Ser. No. 11/837,837, entitled "System and Method for Annotating Documents," by inventors Lichan Hong, and Ed H. Chi, filed 13, Aug., 2007, which is incorporated by reference in its entirety herein.

BACKGROUND

1. Field

The present disclosure relates to annotation of electronic documents. More specifically, the present disclosure relates to a method for collaboratively tagging and highlighting electronic documents.

2. Related Art

Web-based services are widely available on the Internet today. Many web-based services allow social tagging of documents, such as Yahoo's MyWeb and del.icio.us. With such services, a user can tag documents (such as web pages) of interest for sharing or later reference by bookmarking the document and attaching a set of freely chosen tags (or keywords) to it. Also, a user may elect to share his bookmarks or tags with other users. These tags may subsequently be searched and browsed by the other users. In addition to tagging, a user can also annotate the content of a web page. For example, a user may choose to highlight part of a web page, or insert a comment. Similarly to the sharing of bookmarks with other users, a user can share his annotated web documents with other users, such as users on his friends list or other general users.

When sharing his tagging and annotation of certain documents, or viewing other people's tagging and annotations, a user often would like to control the scope of his searching or browsing space. Most existing social tagging services allow a user to identify a list of friends with whom he can share tagging and annotation. However, this manual friends-list creation process can be tedious and burdensome, especially when a user wishes view annotations in the same interest area by users not on his friends list and also allow such users to view different annotated documents.

SUMMARY

One embodiment of the present invention provides a method for allowing a first user to view a collaboratively annotated electronic document. During operation, the system identifies a set of users based on the similarities of online behavior between the identified users and the first user. The system further ranks the identified users based on degrees of similarities between these users and the first user. The system then retrieves an electronic document selected for viewing by the first user and determines whether at least one of the identified users has annotated the electronic document. Based on the determination, the system augments the electronic document with annotations from the identified user and displays the annotated electronic document to the first user.

In a variation on this embodiment, the system notifies the first user when at least one identified user has annotated an electronic document.

In a further variation on this embodiment, notifying the first user involves performing at least one of the following operations: sending an email, sending a text message, posting a notice on the first user's Really Simple Syndication (RSS) reader, and posting a notice on the first user's login page.

In a variation on this embodiment, the online behavior includes at least one of the following actions: browsing web pages, searching the web using a search engine, tagging electronic documents, annotating electronic documents, online shopping, and video streaming.

In a further variation on this embodiment, the system determines the similarity of online behavior based on the overlap of frequently used tags between two users.

In a further variation on this embodiment, the system assigns a weight to a frequently used tag, thereby facilitating better identification of a user who has similar online behavior as the first user in a special area of interest.

In a variation on this embodiment, displaying of the annotated document includes displaying annotations from different users based on their respective similarity rankings.

In a further variation on this embodiment, displaying the annotations from different users based on their respective similarity rankings comprises using a color scheme to display annotations from different users.

BRIEF DESCRIPTION OF THE FIGURES

Color Drawings

The patent or application file contains at least one drawing executed in color. Copies of this patent or patent application publication with color drawing(s) will be provided by the Office upon request and payment of the necessary fee.

FIG. 4 illustrates an exemplary display of a collaboratively annotated electronic document in accordance with one embodiment of the present invention.

DETAILED DESCRIPTION

Figure 1:
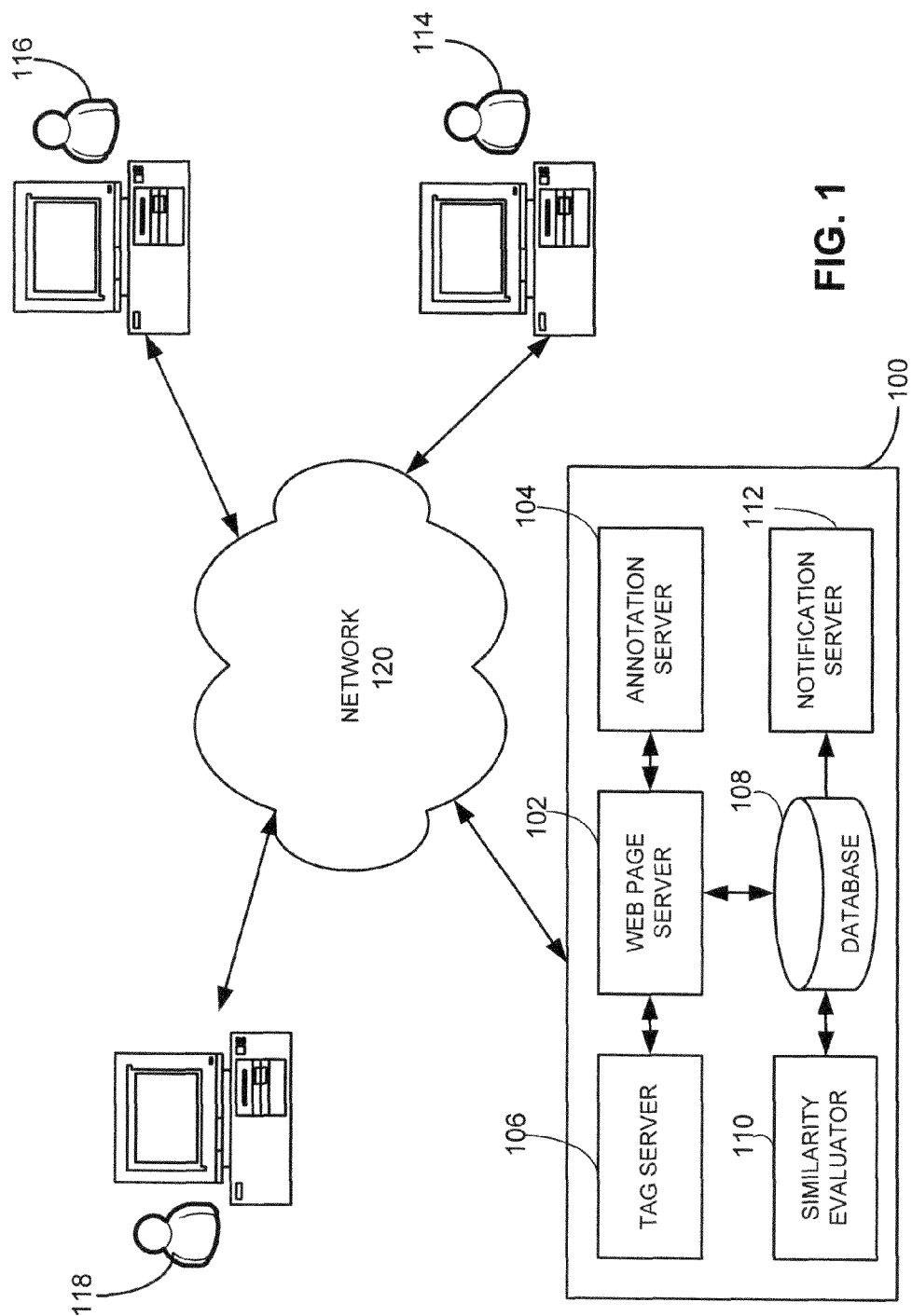
FIG. 1 illustrates exemplary servers and clients which facilitates collaborative tagging and annotation of electronic documents, in accordance with one embodiment of the present invention.

The following description is presented to enable any person skilled in the art to make and use various embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

Overview

Embodiments of the present invention provide a method for allowing a user to view a collaboratively annotated electronic document. The electronic document is annotated by of the user's friends, who are identified based on the similarities of their online behavior to that of the user. This collaborative annotation system also facilitates a ranking mechanism, which ranks the friends based on their levels of similarity to the user. When the collaboratively annotated electronic document is presented to the user, annotations from different friends are presented to the user based on their similarity-ranking order. Presenting annotations based on their author's similarity level enables the user to focus his attention on the part of the document which may interest him the most.

Generating Friends List

Many online social networking services (e.g., Facebook, MySpace) or social bookmarking services (e.g., del.icio.us) allow a user to either join a social group or maintain a friends list. The user can share his online activities, such as the tagging and annotating of a web document, with his friends who belong to the same social group or are on his friends list. The user is often required to configure his affiliated social group and friends list manually. The manual nature of maintaining the friends list provides good control for the filtering of information, such as other users' annotations, to the user. However, it also limits the possibility for the user to discover other potential "friends" who may have the same interests.

In one embodiment of the present invention, instead of having a user configure his friends list manually, e.g. by adding one friend at a time, the system automatically identifies a set of users who can be potential friends for a user based on their common interests or based on their similarities. In order to determine user similarities, in one embodiment, the system monitors each user's online behavior, which includes but is not limited to: browsing web pages, searching the web, tagging web documents, annotating web documents, online shopping, and online video streaming. For example, the system can track web pages viewed, keywords searched, tag words chosen, annotations added, goods bought online, and videos downloaded by a user and summarize the user's interests. By comparing the similarities of online behavior among users, the system may find other users that share interests with a user, and add them to the friends list of the user. For example, if a user often tags web pages using certain tag words such as "movie" and "science fiction," when the system detects another user who uses similar tags or downloads science fiction movies, the system can determine that a similarity of interest exists between these two users and add them to each other's friends list.

There is often more than one friend having various degrees of similarity with a user. In order to provide a user with more accurate information, in one embodiment, the system ranks the identified friends based on their similarity levels. Various methods can be used to evaluate user similarities. In one embodiment, the system evaluates a similarity level between two users based on their tagging behavior by calculating the ratio between the size of the tag intersection (the number of the same or similar tags used by both users) and the size of the tag union (the total number of tags used by both users). Note that in this example the system treats all tags equally. However, in order to better distinguish friends sharing a special interest, the system may treat tags differently. In one embodiment, the system assigns a weight function to each tag word. For example, the system can assign a lower weight to the most commonly used tags, such as "movie," "music," and "shopping"; and a higher weight to less commonly used tags, such as the name of a rare disease or the name of a not-so-well-known author. In another embodiment, the system may let the user choose how to assign weight to tags. For example, for a user who is interested in finding support group members for a certain type of cancer, he may tell the system to assign a higher weight to tags related to cancer drugs and treatments.

Based on the similarity evaluations, the system can create a friends list for a user. For example, in one embodiment, the system can determine that if the similarity level between the two users is greater than a threshold value, they can be added to each other's friends list. The threshold value can be a default value assigned by the system or a value chosen by the user. Instead of using a threshold value, the system may choose to cap the number of friends on the friends list. In one embodiment, the system only places a predetermined number of friends who have the highest similarity levels on the user's friends list. Similar to the threshold value, the cap value of the length of the friends list can be assigned by the system or chosen by the user.

In addition to generating a friends list automatically, the system may also allow a user to configure his friends list manually. In one embodiment, the system allows a user to browse the profiles of users on his friends list to add or delete friends, or to rearrange the ranking order.

Note that due to the dynamic nature of online user behavior, such as the emergence of new users or the change of behavior of existing users, the friends list of a user is generated dynamically. In one embodiment, the system refreshes the friends list for a user periodically. In another embodiment, the system refreshes the friends list for a user upon the user's request.

FIG. 1 illustrates exemplary servers and clients which facilitates collaborative tagging and annotation of electronic documents, in accordance with one embodiment of the present invention. In FIG. 1, users 114, 116, and 118 can be in communication with each other through a network 120. A server system 100 is coupled to network 120. Server system 100 includes a web page server 102 that retrieves and displays web pages to users, an annotation server 104 that allows users to annotate web pages, a tag server 106 that allows users to tag web pages, and a database 108 that stores the tagged or annotated web pages for later display. Server system 100 also stores the online behavior information for each user. For example, a similarity evaluator 110 evaluates online behavior similarity levels among users and a notification server 112 sends notifications to users regarding their friends' online activities. Note that the architecture of server system 100 shown in FIG. 1 is for exemplary purposes only; embodiments of the present invention may use other architectures as long as they can provide similar functionalities. For example, web page server 102, annotation server 104, and tag server 106 on server system 100 may be located on individual computer systems coupled through network 120.

Figure 2:
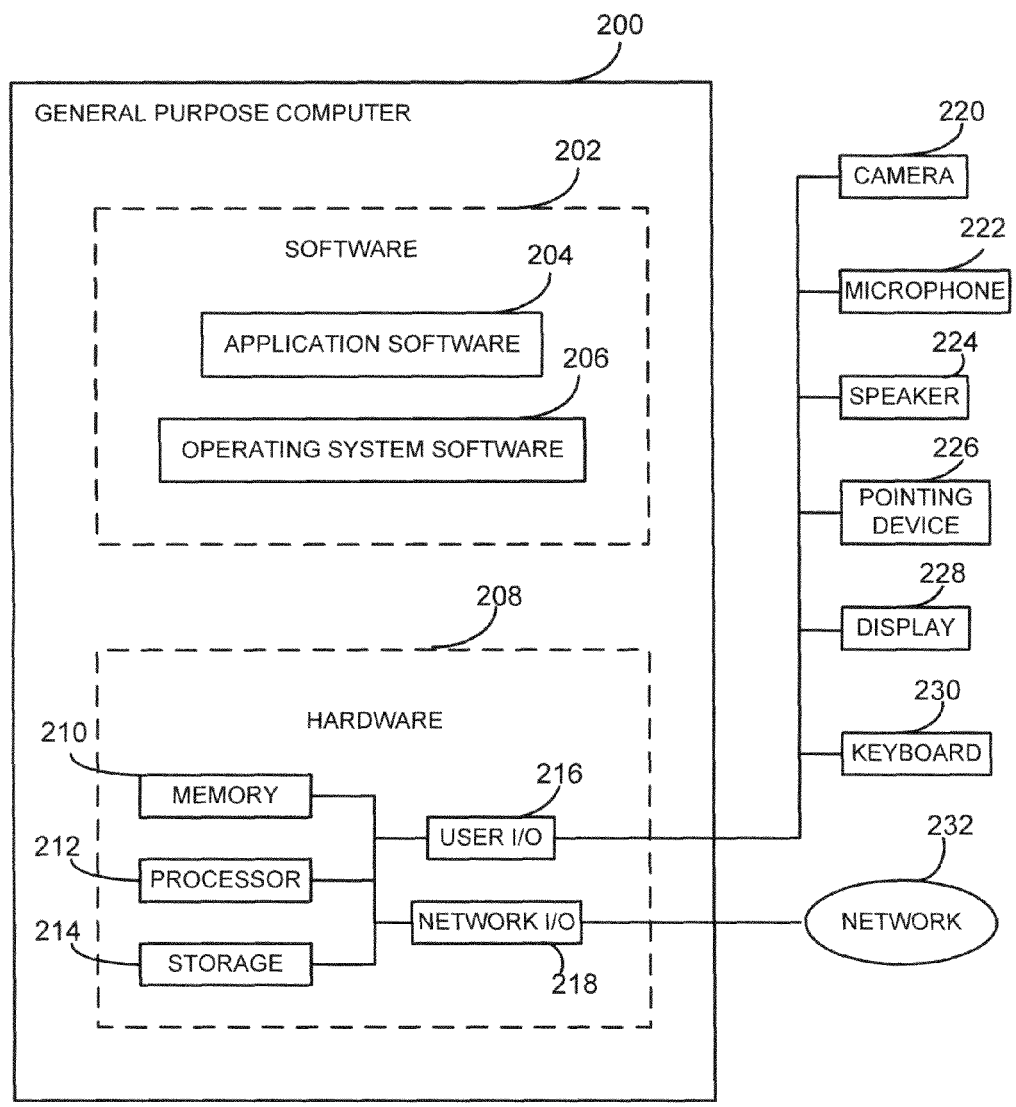
FIG. 2 illustrates an exemplary computer system for carrying out embodiments of the present invention, in accordance with one embodiment of the present invention.

Both the computer systems used on the user (client) side and server side in FIG. 1 can be a general purpose computer. FIG. 2 illustrates the architecture of a general purpose computer 200, which can be used as a client or a server, in accordance with one embodiment of the present invention. General purpose computer 200 includes software 202 and hardware 208. Hardware 208 includes a memory 210, a processor 212, a storage unit 214, a user I/O 216, and a network I/O 218. User I/O 216 can include a camera 220, a microphone 222, a speaker 224, a pointing device 226 (e.g., pointing stick, mouse, etc.), a display 228, and a keyboard 230. Network I/O 218 may, for example, be coupled to a network 232 such as the Internet. Software 202 of general purpose computer 200 includes operating system software 206 and application software 204, which may include the instructions of the client side applications or the server side applications.

Receiving Collaboratively Annotated Web Document

Once the system creates a friends list for a user, the system can enhance the online experience of the user by providing the user with information from his friend. One type of user experience enhancement involves presenting a user with web pages that his friends find interesting. In one embodiment, the system can inform a user of web pages that have been tagged or annotated by users on his friends list, especially those with higher similarity levels. As a result, the user can receive updated information about things he might be interested in without doing extensive web searching himself. For example, a user is interested in finding treatment for a type of cancer, and the system generates a set of friends for him who have similar interests. The system monitors his friends' online activities, and when one of his friends tags an article on the web introducing, for example, a new herbal treatment for the cancer, the system alerts the user about the tagged page. Upon receiving the alert, the user can then retrieve the tagged page. There are various ways for the system to alert a user with information about his friends' online activities. For example, the system can send an email or a text message to the user. Other ways to alert the user include, but are not limited to, posting a notice on the user's RSS reader and posting a notice on the user's login page.

Figure 3:
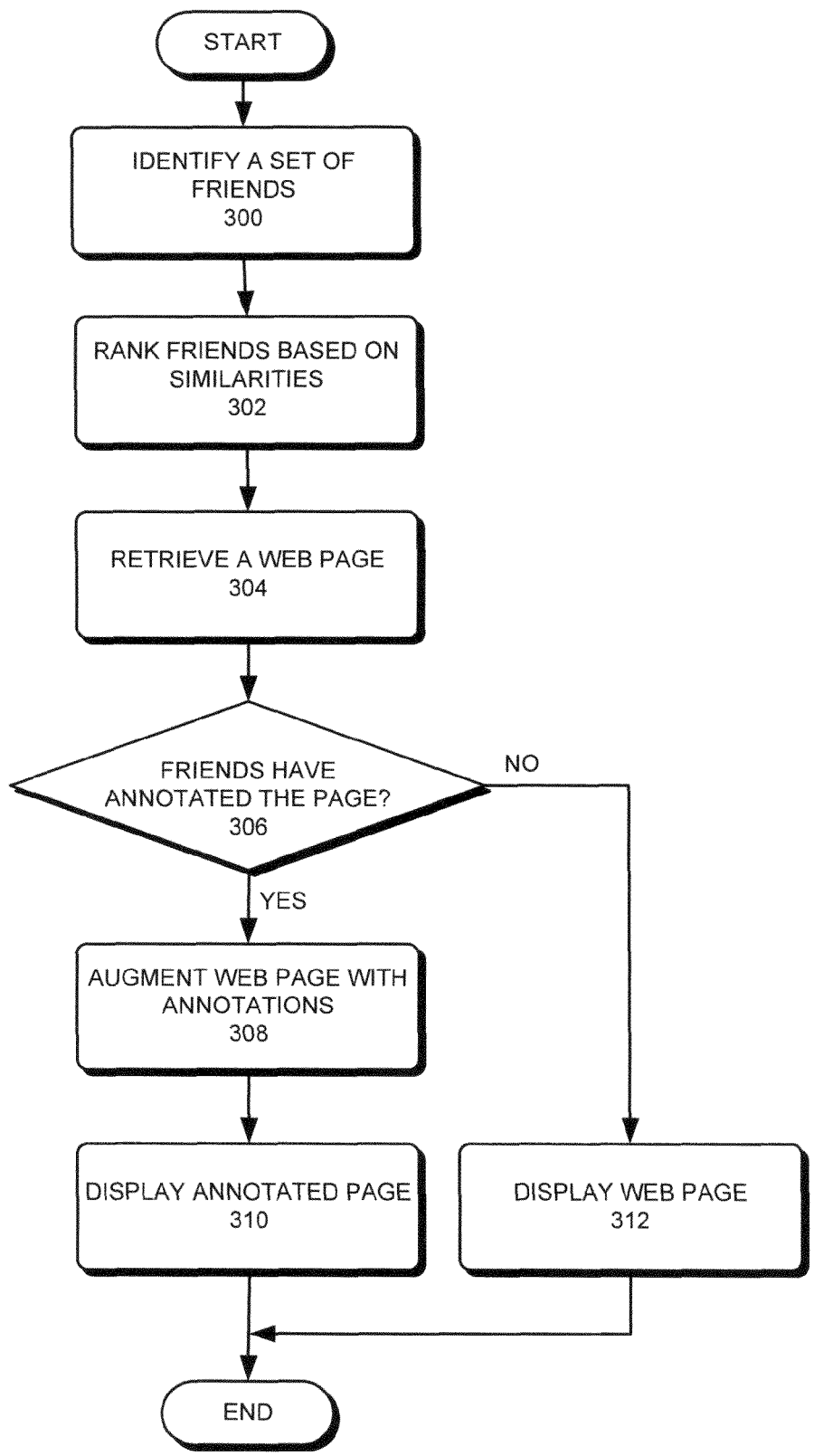
FIG. 3 presents a flowchart illustrating an exemplary process for displaying a collaboratively annotated electronic document in accordance with one embodiment of the present invention.

Another type of user experience enhancement involves allowing a user to view a collaboratively annotated web document. FIG. 3 presents a flowchart that illustrates an exemplary process in accordance with one embodiment of the present invention. During operation, the system identifies a set of friends for a user based on online behavior similarities (operation 300). The system also ranks the friends based on their level of similarities (operation 302). Subsequently, the user requests to view a web page (operation 304). The system then determines whether any of his friends have annotated the requested web page (operation 306). If so, the system augments the web page with his friends' annotations (operation 308). Otherwise, the system displays the web page to the user (operation 312). The system further displays the collaboratively annotated web page (operation 310).

Presenting a user with a collaboratively annotated web document allows the user to go directly to sections in the web document that might be important, for example the sections that have been highlighted by his friends, without going through the whole document. Therefore, the user can obtain information in a more efficient way. In addition to highlighting, the user's friends may also add comments to a web document, which can provide additional information to the user or make the reading experience more enjoyable. For example, when one friend tags a web document introducing a novel treatment to a type of cancer, the friend may comment on the effectiveness of the treatment based on his own experience. Such comments may be very valuable to a user who is viewing the collaboratively annotated document.

Displaying Collaboratively Annotated Web Document

When the system retrieves a collaboratively annotated web document and displays it to the user, in order to avoid information clutter, and to better direct the user's focus, the system can display annotations from different friends discriminately using a visual effect. Because a user is more likely to be interested in annotations provided by a friend that has the most similarity, the system can differentiate annotations from different friends based on their similarity ranks.

Various visual schemes can be used to differentiate the annotations. FIG. 4 presents an example of differentiating annotations using a color scheme in accordance with one embodiment of the present invention. FIG. 4 illustrates part of a web page viewed by a user, in which paragraphs have been tagged and highlighted by three friends.

In FIG. 4, paragraphs 402, 406 and 410 are highlighted and tagged by three friends. Tag fields 400, 404, and 408 are inserted behind paragraphs 400, 404, and 410, respectively, showing the user-IDs (KoolTag, MyHealth, and Luk) of the friends and their chosen tag words. Among the three friends, KoolTag ranks the highest in similarity level. Therefore, paragraph 402, which is highlighted by KoolTag, is highlighted with a deep red color. On the other hand, MyHealth has a lower similarity rank; consequently, paragraph 406, which is highlighted by MyHealth, is highlighted with a lighter color, pink. Paragraph 410 is highlighted by Luk, who ranks the lowest in similarity level, and as a result, paragraph 410 is highlighted with an even lighter color, yellow. Note that it is natural for the user to first focus his attention on a paragraph highlighted with a darker color and then to direct his attention to paragraphs highlighted with lighter colors. Therefore, this color scheme uses a darker, brighter color to display the annotations from a friend with a higher similarity rank, and lighter, less bright colors to display annotations from a friend with lower similarity ranks.

Other visual effects can also be adopted to differentiate annotations by friends of different similarity ranks. In one embodiment, the system uses font size to differentiate annotations. For example, annotation from a friend with a higher similarity rank is displayed using a larger font. In another embodiment, the system displays higher ranked annotations using a bold face font.

Note that in some cases the number of friends who annotate a web page may be overwhelming, and displaying all annotations may clutter the web page and cause viewing difficulty. In one embodiment, a user can limit the amount of annotations shown on the web page. For example, the user can make sure that only the annotations from the three highest ranked friends are displayed. In another embodiment, the system allows a user to view the same web page more than once, each time showing different annotations.

In one embodiment, if more than one friend has annotated the same paragraph of a web page, the system only displays the annotation from the highest ranked friend.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the various embodiments is defined by the appended claims.

What is claimed is:

1. A method for allowing a first user to view a collaboratively annotated electronic document, the method comprising:

generating, by a computer, a friend list comprising a plurality of friends based on similarities of web browsing behavior between the friends and the first user;

ranking the friends based on degrees of the similarities between the friends and the first user;

monitoring the friends' web browsing behavior;

identifying an electronic document associated with the monitored web browsing behavior;

retrieving the identified electronic document;

determining whether at least one of the friends has annotated the electronic document;

based on the determination, augmenting the electronic document using annotations from the at least one of the friends, wherein augmenting the electronic document involves:
highlighting at least one portion of the electronic document; and
inserting a tag field that indicates a tag word chosen by a friend associated with the highlighted portion; and
displaying the augmented electronic document to the first user.

2. The method of claim 1, further comprising:
notifying the first user when at least one friend has annotated an electronic document.

3. The method of claim 2,
wherein notifying the first user comprises performing at least one of the following operations:
sending an email;
sending a text message;
posting a notice on the first user's Really Simple Syndication (RSS) reader; and
posting a notice on the first user's login page.

4. The method of claim 1,
wherein the web browsing behavior further comprises tagging web documents.

5. The method of claim 1,
wherein determining the degrees of the similarities comprises assigning a weight to a frequently used tag, thereby facilitating better identification of a friend who has similar online behavior as the first user in a special area of interest.

6. The method of claim 1,
wherein displaying the augmented electronic document comprises displaying annotations from different friends based on their respective similarity rankings.

7. The method of claim 6, wherein displaying annotations from different friends based on their respective similarity rankings comprises using a color scheme to display annotations from different friends.

8. A non-transitory computer-readable medium storing instructions which when executed by a computer cause the computer to perform a method for allowing a first user to view a collaboratively annotated electronic document, the method comprising:
generating a friend list comprising a plurality of friends based on similarities of web browsing behavior between the friends and the first user;
ranking the friends based on degrees of the similarities between these friends and the first user;
monitoring the friends' web browsing behavior;
identifying an electronic document associated with the monitored web browsing behavior of the friends;
retrieving the identified electronic document;
determining whether at least one of the friends has annotated the electronic document;
based on the determination, augmenting the electronic document using annotations from the at least one of the friends, wherein augmenting the electronic document involves:
highlighting at least one portion of the electronic document; and
inserting a tag field that indicates a tag word chosen by a friend associated with the highlighted portion; and
displaying the augmented electronic document to the first user.

9. The computer-readable medium of claim 8,
wherein the method further comprises notifying the first user when at least one friend has annotated an electronic document.

10. The computer-readable medium of claim 9,
wherein notifying the first user comprises performing at least one of the following operations:
sending an email;
sending a text message;
posting a notice on the first user's Really Simple Syndication (RSS) reader; and
posting a notice on the first user's login page.

11. The computer-readable medium of claim 8,
wherein the web browsing behavior further comprises tagging web documents.

12. The computer-readable medium of claim 8,
wherein determining the degrees of the similarities comprises assigning a weight to a frequently used tag, thereby facilitating better identification of a friend who has similar web browsing behavior as the first user in a special area of interest.

13. The computer-readable medium of claim 8,
wherein displaying the augmented electronic document comprises displaying annotations from different friends based on their respective similarity rankings.

14. The computer-readable medium of claim 13,
wherein displaying annotations from different friends based on their respective similarity rankings comprises using a color scheme to discriminately display annotations from different friends.

15. A computer system that allows a first user to view a collaboratively annotated electronic document, the computer system comprising:
a memory;
a processor;
a friend-list-generating mechanism configured to generate a friend list comprising a plurality of friends based on similarities of web browsing behavior between the friends and the first user;
a ranking mechanism configured to rank the friends based on degrees of the similarities between these friends and the first user;
a monitoring mechanism configured to monitor the friends' web browsing behavior;
an identification mechanism configured to identify an electronic document associated with the monitored web browsing behavior of the friends;
a retrieval mechanism configured to retrieve the identified electronic document;
a determination mechanism configured to determine whether at least one of the friends has annotated the electronic document;
an augmentation mechanism configured to augment the electronic document using annotations from the at least one of the friends, wherein while augmenting the electronic document, the augmentation mechanism is configured to:
highlight at least one portion of the electronic document; and
insert a tag field that indicates a tag word chosen by a friend associated with the highlighted portion; and
a display mechanism configured to display the augmented electronic document to the first user.

16. The computer system of claim 15, further comprising:
a notification mechanism configured to notify the first user when at least one friend has annotated an electronic document.

17. The computer system of claim 16,
wherein while notifying the first user, the notification mechanism is configured to perform at least one of the following operations:
sending an email;
sending a text message;
posting a notice on the user's RSS reader; and
posting a notice on the user's login page.

18. The computer system of claim 15,
wherein the web browsing behavior further comprises tagging web documents.

19. The computer system of claim 15,
wherein while determining the degrees of the similarities, the second determination mechanism is configured to assign a weight to a frequently used tag, thereby facilitating better identification of a friend who has similar web browsing behavior as the first user in a special area of interest.

20. The computer system of claim 15,
wherein while displaying the augmented electronic document, the display mechanism is configured to display annotations from different friends based on their respective similarity rankings.

21. The computer system of claim 20,
wherein while displaying annotations from different friends based on their respective similarity rankings, the display mechanism uses a color scheme to display the annotations from different friends.

22. The method of claim 4,
wherein the degrees of similarities of online behavior are determined based on the overlap of frequently used tags between the first user and the friends.

23. The computer-readable medium of claim 11,
wherein the degrees of similarities of online behavior are determined based on the overlap of frequently used tags between the first user and the friends.

24. The computer system of claim 18,
further comprising a second determination mechanism configured to determine the degrees of similarities of online behavior based on the overlap of frequently used tags between the first user and the friends.

* * * * *